(12) United States Patent
Kamhi et al.

(10) Patent No.: US 10,343,593 B2
(45) Date of Patent: Jul. 9, 2019

(54) REAL-TIME ANALYSIS AND AUGMENTED PATHWAY PROJECTION FOR VEHICLE PASSENGERS

(71) Applicant: GM Global Technology Operations LLC, Detroit, MI (US)

(72) Inventors: Gila Kamhi, Tel Aviv (IL); Yael Shmueli Friedland, Tel Aviv (IL); Asaf Degani, Tel Aviv (IL); Kobi Nistel, Kadima Zoran (IL)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 15/729,224

(22) Filed: Oct. 10, 2017

(65) Prior Publication Data

US 2019/0106050 A1   Apr. 11, 2019

(51) Int. Cl.
*B60Q 1/24*      (2006.01)
*G06K 9/00*      (2006.01)

(52) U.S. Cl.
CPC ........... *B60Q 1/24* (2013.01); *G06K 9/00805* (2013.01); *B60Q 2400/40* (2013.01)

(58) Field of Classification Search
CPC .. G07C 5/085; G07C 5/0891; G07C 9/00087; G07C 9/00111; G08B 13/19647; G08B 13/19697; G08B 17/00; G08B 21/22; G08B 31/00; H04K 2203/16; H04K 2203/22; H04K 2203/24; H04K 3/226; H04K 3/28; B60K 2350/1084; B60K 2350/2039; B60K 2350/924; B60K 2350/965; B60K 35/00; B60K 6/445; B60Q 5/005; B60Q 9/008; B60R 1/00; B60R 1/008; B60R 2300/105; B60R 2300/108; B60R 2300/301; B60R 2300/302; B60R 2300/404; B60R 2300/802; B60R 2300/8033; B60R 2300/8093; B60Y 2410/10; G01S 13/86; G01S 13/931; G01S 19/13; G06K 9/00369; G06K 9/00791; G06K 9/6267; G06K 9/0063; B60W 10/08; B60W 10/18; B60W 10/182; B60W 10/184; B60W 10/20; B60W 10/26; B60W 2050/0002; B60W 2550/10; B60W 2550/20; B60W 30/09; B60W 30/18027; B60W 30/18109; B60W 30/182; B60W 50/0097; B60W 50/06; B60W 50/082; B62D 15/0285; G01C 21/3638; G01C 21/365; G05D 1/0044; G05D 1/0088; G05D 1/021; G05D 1/0212; G05D 1/0246; G05D 1/0274; G05D 2201/0212; G05D 2201/0213; G06T 2207/30252;
(Continued)

(56) References Cited

U.S. PATENT DOCUMENTS 5,963,127 A * 10/1999 Lang ................... B60Q 9/008
                                                      180/167
6,795,237 B1 * 9/2004 Marinelli ............... G02B 23/12
                                                      359/353
(Continued)

*Primary Examiner* — Daniel Previl
(74) *Attorney, Agent, or Firm* — Quinn IP Law

(57) ABSTRACT

A method of augmented projection for vehicle passengers includes sensing that the passenger is within, or about to enter, a drop zone, and sensing one or more static obstacles within the drop zone. The method further includes highlighting at least one of the static obstacles with a projector mounted on the vehicle.

16 Claims, 5 Drawing Sheets

(58) Field of Classification Search
CPC . G06T 2207/30256; G06T 2207/30261; G06T 7/20
USPC .... 340/435, 425.5, 901–903, 436, 441, 522, 340/438–439, 444–447, 457, 463–465, 340/468, 488, 691.6, 692
See application file for complete search history.

(56) References Cited

U.S. PATENT DOCUMENTS

| | | | |
|---|---|---|---|
| 9,679,209 B2* | 6/2017 | Omi | G08B 21/06 |
| 2006/0092649 A1* | 5/2006 | Bynum | B60Q 3/51 |
| | | | 362/488 |
| 2012/0056734 A1* | 3/2012 | Ikeda | G08G 1/165 |
| | | | 340/425.5 |
| 2017/0169703 A1* | 6/2017 | Carrasco | B60Q 1/525 |
| 2017/0259729 A1* | 9/2017 | Balasundrum | B60Q 3/30 |
| 2018/0039917 A1* | 2/2018 | Buttolo | G01C 21/3438 |
| 2018/0072313 A1* | 3/2018 | Stenneth | B60W 30/09 |

* cited by examiner

REAL-TIME ANALYSIS AND AUGMENTED PATHWAY PROJECTION FOR VEHICLE PASSENGERS

INTRODUCTION

This disclosure generally relates to passenger vehicles, including conventional and autonomous vehicles. In particular, the disclosure relates to vehicle with a passenger exiting or entering the vehicle.

SUMMARY

A method of augmented projection for vehicle passengers is provided. The method includes sensing that the passenger is within a drop zone, and sensing one or more static obstacles within the drop zone. The method further includes highlighting the static obstacles with a projector mounted on the vehicle. Additionally, the method may include sensing that the passenger is about to enter the drop zone.

In some configurations, the method may sense one or more dynamic obstacles within the drop zone, and may highlight the sensed dynamic obstacles with the projector mounted on the vehicle. The method may determine a predicted pathway of the sensed dynamic obstacles within the drop zone, and highlight the predicted pathway of the dynamic obstacles with the projector mounted on the vehicle.

In some configurations, the method may determine and project a suggested pathway for the passenger. The suggested pathway avoids the static obstacles. The suggested pathway may also avoid the predicted pathway of the dynamic obstacles.

In some configurations, the method may sense proximity of the passenger to the one or more static or dynamic obstacles within the drop zone. The method may have a low-intensity projection and a high-intensity projection, such that the high-intensity projection is used when the passenger is proximal to at least one of the static or dynamic obstacles.

In some configurations, the method may assign a first severity level to a first static object, such that highlighting static obstacles includes a first projection type for the first severity level. The method may also assign a second severity level to a second object, such that highlighting static obstacles includes a second projection type, which is different from the first projection type, for the second severity level. The sensing may be two-dimensional or three-dimensional.

In some configurations, the method may further include sensing location of the passenger within the drop zone, and determining proximity of the passenger to the one or more static obstacles. The method may compare the determined proximity of the passenger to a minimum distance, and may sound one of various audio alerts when the passenger is less than the minimum distance from one of the static obstacles.

An apparatus for augmented projection from a vehicle is also provided. The apparatus includes one or more sensors configured to determine whether a passenger is within a drop zone, and to determine a location of one or more static obstacles within the drop zone. The apparatus further includes a projector configured to highlight at least one of the sensed static obstacles within the drop zone.

The above features and advantages, and other features and advantages, of the present subject matter are readily apparent from the following detailed description of some of the best modes and other configurations for carrying out the disclosed structures, methods, or both.

DETAILED DESCRIPTION

Figure 1:
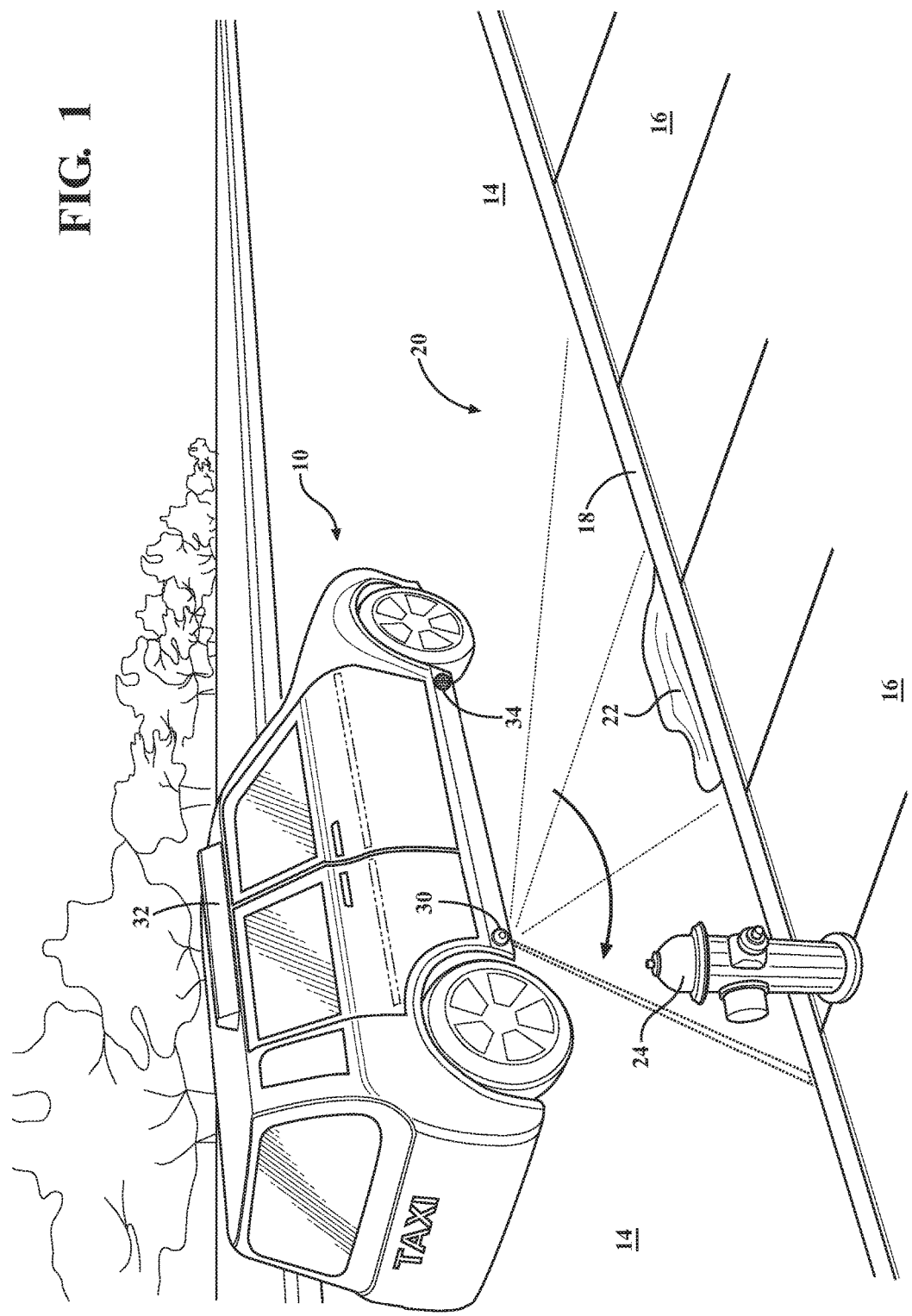
FIG. 1 is a schematic isometric view of a vehicle scanning a drop zone.

In the drawings, like reference numbers correspond to like or similar components whenever possible throughout the several figures. There is shown in FIGS. 1-4 schematic views of a vehicle 10 for transporting one or more passengers 12 (show in FIG. 3). The vehicle 10 may be a taxi, may be a ride-share vehicle, or may be privately-operated. Additionally, the vehicle 10 may be autonomous, conventional, or combinations thereof. The vehicle 10 is configured to provide augmented projection for the passenger 12.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

When used herein, the term substantially refers to relationships that are, ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance.

For example, coverages, areas, or distances may generally be within 10% of perfection for substantial equivalence. Similarly, relative alignments, such as parallel or perpendicular, may generally be considered to be within 5%.

In the figures, the vehicle 10 is shown on a street 14 adjacent a sidewalk 16. In this case, the sidewalk 16 meets the street 14 at a curb 18. The situation illustrated may occur, for example and without limitation, when the vehicle 10 is dropping the passenger 12 in a drop zone 20 or picking the passenger 12 up from the drop zone 20.

The drop zone 20 may be defined as the range of the environment surrounding the vehicle 10 over which the vehicle, or the driver thereof, is watching or responsible for the passenger 12. For example, and without limitation, the drop zone 20 may extend a few meters to the front and back of the vehicle 10, and from either side of the vehicle 10 to the standard or expected depth or width of sidewalks 16 in the operating area of the vehicle 10.

Therefore, the vehicle 10 is configured to sense that the passenger 12 is within the drop zone 20, or about to enter the drop zone 20, such as when the passenger 12 is exiting the vehicle 10. As used herein, the passenger 12 may be considered to be about to enter the drop zone 20 if expected to do so within, for example and without limitation, the next five to ten seconds. The vehicle 10 is further configured to sense one or more obstacles within the drop zone 20. For example, FIG. 1 illustrates two static obstacles, a first obstacle 22, which is a puddle or a water-filled pothole, and a second obstacle 24, which is a hydrant. The obstacles shown in the figures are exemplary of many types of obstacles that may occur on the street 14, the sidewalk 16, or surrounding areas of the drop zone 20.

The vehicle 10 is configured to sense obstacles with one or more scanners or sensors 30. For example, and without limitation, the sensors 30 may include radar or optical recognition capabilities, and may have two-dimensional or three-dimensional sensing capabilities.

The vehicle 10 may include several components configured to assist the passenger 12 in identifying or recognizing obstacles, such as the first obstacle 22 and the second obstacle 24. For example, the vehicle 10 has a projector bar or light bar 32 mounted to on its roof. Augmented projections from the light bar 32 may help the passenger 12 identify obstacles within the drop zone 20, as described herein.

Additionally, a speaker 34 is mounted lower, and toward the front of the vehicle 10. The speaker 34 may be used, as described herein, to alert the passenger 12 to proximate objects. Sound may also be produced by other components of the vehicle 10, such as the horn or the interior entertainment or information systems.

Note that the locations of the components on the vehicle 10 shown are not limiting, such that the sensor 30, the light bar 32, and speaker 34 may be in other locations, and also may not be visible from outside of the vehicle 10 or may be hidden within the vehicle 10. Additionally, the components are provided to illustrate functions performed by the vehicle 10, relative to passengers 12 and to the drop zone 20. The functions may be incorporated into a single component or system, or may be performed by additional components that are not shown but would be recognized by skilled artisans. The vehicle 10 may also be configured to sense that the passenger 12 is about to enter the drop zone 20, in addition to sensing that the passenger 12 is within the drop zone 20.

As shown in FIG. 1, the sensor 30 scans or sweeps the drop zone 20 to identify static, and also dynamic, obstacles, such as the first obstacle 22 and the second obstacle 24. The vehicle 10 includes a controller, computer, or control system having sufficient memory and processing power to interact with the components, and equivalents thereof, described herein and to execute the functions, and equivalents thereof, described herein. Skilled artisans will recognize numerous controller architectures that may be used to execute any and all of the functions described herein, in addition to reasonable equivalents or modifications.

Figure 2:
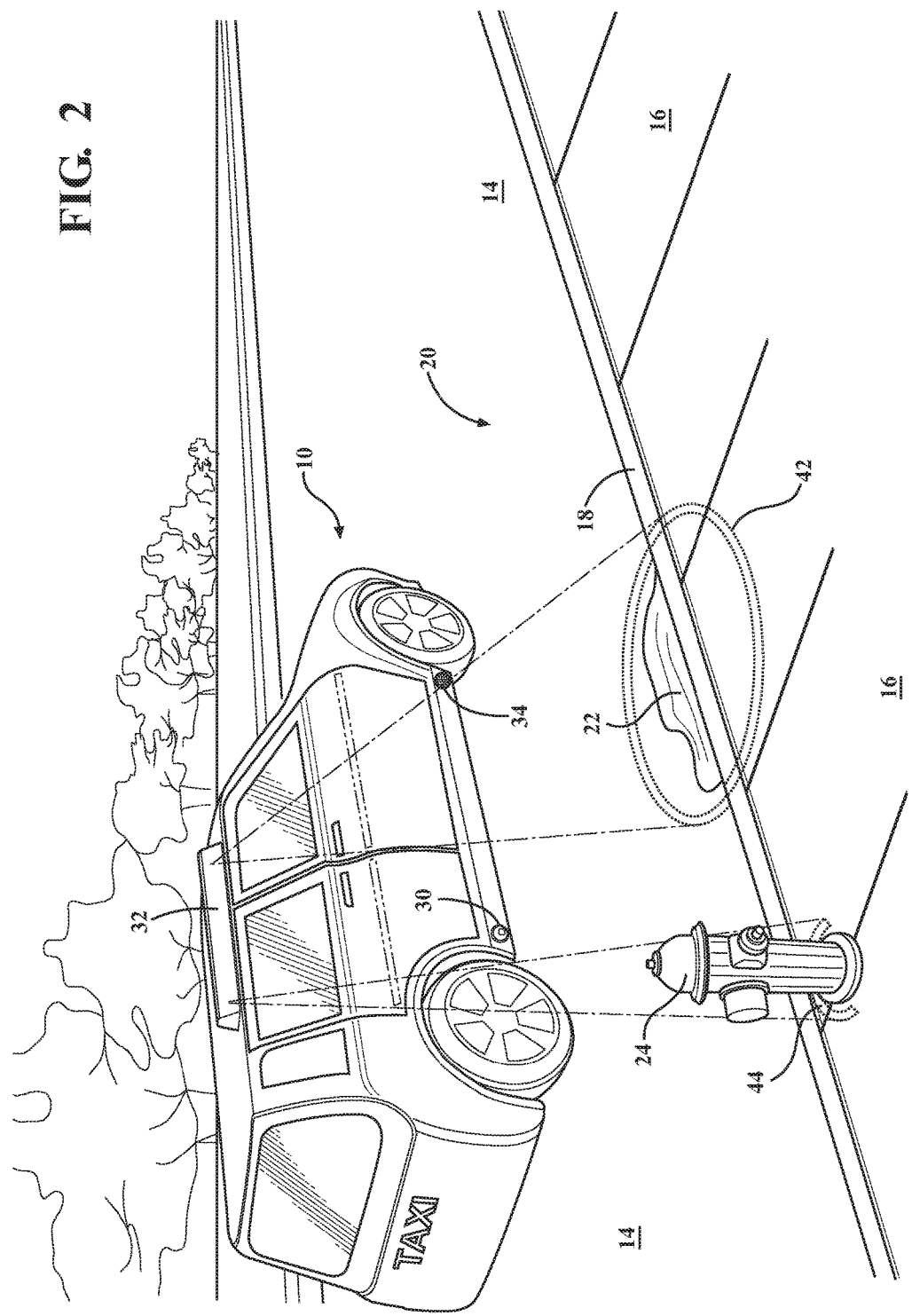
FIG. 2 is a schematic isometric view of the vehicle highlighting static obstacles within the drop zone.

As illustrated in FIG. 2, in order to assist passengers 12 exiting or entering, the vehicle 10 is configured to highlight the static obstacles, such as the first obstacle 22 and the second obstacle 24, with a projector, such as the light bar 32, mounted on the vehicle 10. The vehicle 10, and its processing or control capabilities, may determine the significance of any sensed objects. Additionally, the vehicle 10 may assign a first significance level to one of the static objects, such as the first obstacle 22, and may assign a second significance level to another of the static objects, such as the second obstacle 24. Furthermore, the vehicle 10 may change the way it highlights the objects based on the significance.

For example, the vehicle 10 may highlight the first obstacle 22 with a first projection type 42, based on assigning the first obstacle 22 the first significance level. Similarly, the vehicle 10 may highlight the second obstacle 24 with a second projection type 44, which is different from the first projection type 42, based on assigning the second obstacle 24 the second significance level.

The significance determination may be based on, for example, and without limitation, the perceived need of the passenger 12 to avoid the specific obstacle or to be alerted to the specific obstacle. In the exemplary situation shown in FIG. 2, the second obstacle 24 is a hydrant, which may be perceived as relatively easy for the passenger 12 to see and recognize that possible issues with impacting the second obstacle 24. However, the first obstacle 22 may be a deep pothole that is covered or hidden by a puddle. Therefore, the passenger 12 may not realize that the first obstacle 22 presents significant issues or problems.

The vehicle 10, after determining the significance of the obstacles, may use, for example and without limitation, a different color or brighter light pattern for the first projection type 42, to alert that passenger 12 to the first obstacle 22. Additionally, flashing or moving lights may be used to alert the passenger 12 to different significance levels.

As shown in FIG. 2, the passenger 12 has yet to enter the drop zone 20. Therefore, the vehicle 10 may be highlighting the first obstacle 22 and the second obstacle 24 while the passenger 12 is preparing to exit the vehicle 10. Note that the vehicle 10 may recognize multiple objects of the same significance, such that it may use only the second projection type 44 where multiple objects are determined at the second significance level.

Note that other obstacle types may be sensed and highlighted by the vehicle 10. For example, and without limitation, many configurations of the vehicle 10 will also highlight the location of the curb 18 with the light bar 32. Even though passengers 12 are likely aware of the existence of the curb 18, it may be beneficial to highlight the curb 18, particularly in low light conditions.

The control system of the vehicle 10 may use the sensors to identify horizontal structures, such as the street 14 or the sidewalk 16, that will not be highlighted. Alternatively, the control system of the vehicle 10 may be configured to recognize specific types of objects that may be within the drop zone 20, and then highlight any objects that the control system determines are abnormal or about which the passenger 12 should be alerted. Therefore, the control system may be actively determining, in real time, what the first obstacle 22 and the second obstacle 24 are, or may be determining simply that they are not horizontal objects.

Additionally, when the vehicle 10 is manned by a driver, as opposed to being fully autonomous, the functions described herein may also be used to assist the driver when exiting or entering the vehicle. Furthermore, where the vehicle 10 is autonomous, the functions described herein may be used to assist maintenance personnel attending to the vehicle 10 or to assist those placing objects—such as food or packages for delivery—into the vehicle 10.

Figure 3:
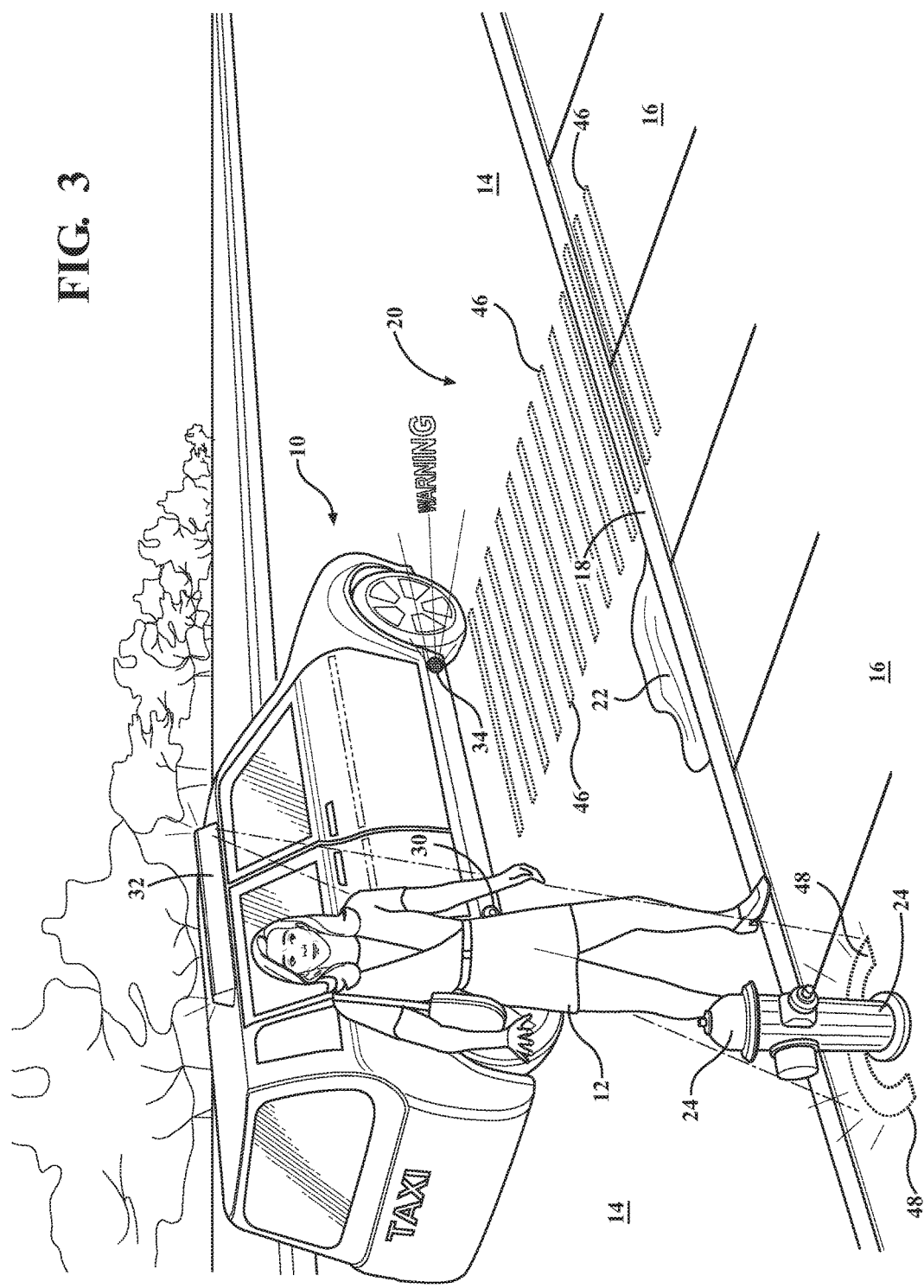
FIG. 3 is a schematic isometric view of the vehicle highlighting a recommended pathway and providing a proximity alert for a passenger.

FIG. 3 shows additional features or functions the vehicle 10 may use to assist the passenger 12, who is illustrated within the drop zone 20. The vehicle 10 may be configured to determine and project a recommended or suggested pathway 46 for the passenger 12. The suggested pathway 46 is configured to, most likely or probably, according to the processor or control system, avoid any sensed static obstacles, and possibly dynamic obstacles. As shown in FIG. 3, the suggested pathway 46 avoids both the first obstacle 22 and the second obstacle 24.

The suggested pathway 46 may work in concert with either or both of the first projection type 42 and the second projection type 44 to highlight the first obstacle 22 and the second obstacle 24, respectively. However, some vehicles 10 may be configured to use only one of the projections or alert styles. For example, the vehicle 10 may only provide the suggested pathway 46 as an indicator of the clear path for the passenger 12. Alternatively, the vehicle 10 may only highlight the obstacles, such as the first obstacle 22 with the first projection type 42 and the second obstacle 24 with the second projection type 44, and allow the passenger 12 to choose her or his own path based on notice of sensed potential obstacles.

Even though the vehicle 10 lights or projects the suggested pathway 46 as a preferred or recommended trajectory, the passenger 12 may not move along the suggested pathway 46. Therefore, the vehicle 10 may also sense or track the location of the passenger 12 within the drop zone 20. The vehicle 10 may sense or determine proximity of the passenger 12 to the one or more static obstacles within the drop zone 20.

As illustrated in FIG. 3, the passenger 12 has moved away from the suggested pathway 46 and is heading in the direction of the second obstacle 24 (the hydrant). Therefore, in addition to highlighting the static obstacles with the projector mounted on the vehicle 10, such as the light bar 32, the vehicle 10 may be configured with both a low-intensity projection and a high-intensity projection based on the proximity of the passenger 12 to sensed objects.

The second projection type 44 shown in FIG. 2 may be the low-intensity projection, which generally just lights or highlights the second obstacle 24. However, as shown in FIG. 3, when the passenger 12 moves into close proximity with the second obstacle, a high-intensity projection 48 may be used to further alert the passenger 12 to the near-by object. The vehicle 10 may compare the determined proximity of the passenger 12 to a minimum distance before triggering the high-intensity projection 48, or may predict the pathway of the passenger 12 to determine that the high-intensity projection 48 should be used. Relative to the second projection type 44, the high-intensity projection 48 may be a brighter light or may be a flashing or a moving augmented projection, and may progressively increase intensity as the passenger 12 moves closer to the object.

Additionally, in combination with, or separate from, the high-intensity projection 48, an audio alert may be sounded when the controller senses that the passenger 12 is near one of the obstacles. The audio alert may be sounded by the speaker 34, or by another component of the vehicle 10, whenever the passenger 12 is less than the minimum distance from one of the static obstacles, such as the close proximity to the second obstacle 24 illustrated in FIG. 3.

Furthermore, the audio alert may be configured to express or identify the potential issue that the passenger 12 may face. For example, as the urgency increases, the sound may become louder with a stronger attack and release, higher in pitch, or disharmonious in nature. The control system may alter the sound characteristics based on a real-time calculation for each situation, such as specific sounds tailored to specific types of obstacles—i.e., the control system may recognize that the second obstacle 22 is a hydrant and audibly communicate that the passenger 12 is proximate to a hydrant. The control system may alter the sound characteristics by tailoring sounds to specific situations, such as proximity to static obstacles or dynamic obstacles, or may change the sound parameters on the fly, such as by increasing intensity of the sound progressively.

In configurations where the passenger 12 is interacting with the vehicle 10 via smart phone, smart watch, or another other electronic communication device, the vehicle 10 may relay audio alerts to the communication device as the speaker. For example, where the vehicle 10 is an autonomous taxi or used for ride-sharing, the passenger 12 may interact with the vehicle 10 via a smart phone or watch app. In these situations, the vehicle 10 may use the smart phone or watch to either create or amplify the audio alert.

The vehicle 10 may also be configured to sense one or more dynamic obstacles 50 within the drop zone 20, either separately or in addition to the sensing static obstacles. In the example shown in FIG. 4, the dynamic obstacle 50 is a skateboarder, but other sensed dynamic obstacles 50 may include, without limitation: animals, pedestrians (walking or jogging), bicyclists, or small vehicles on the sidewalk 16.

Figure 4:
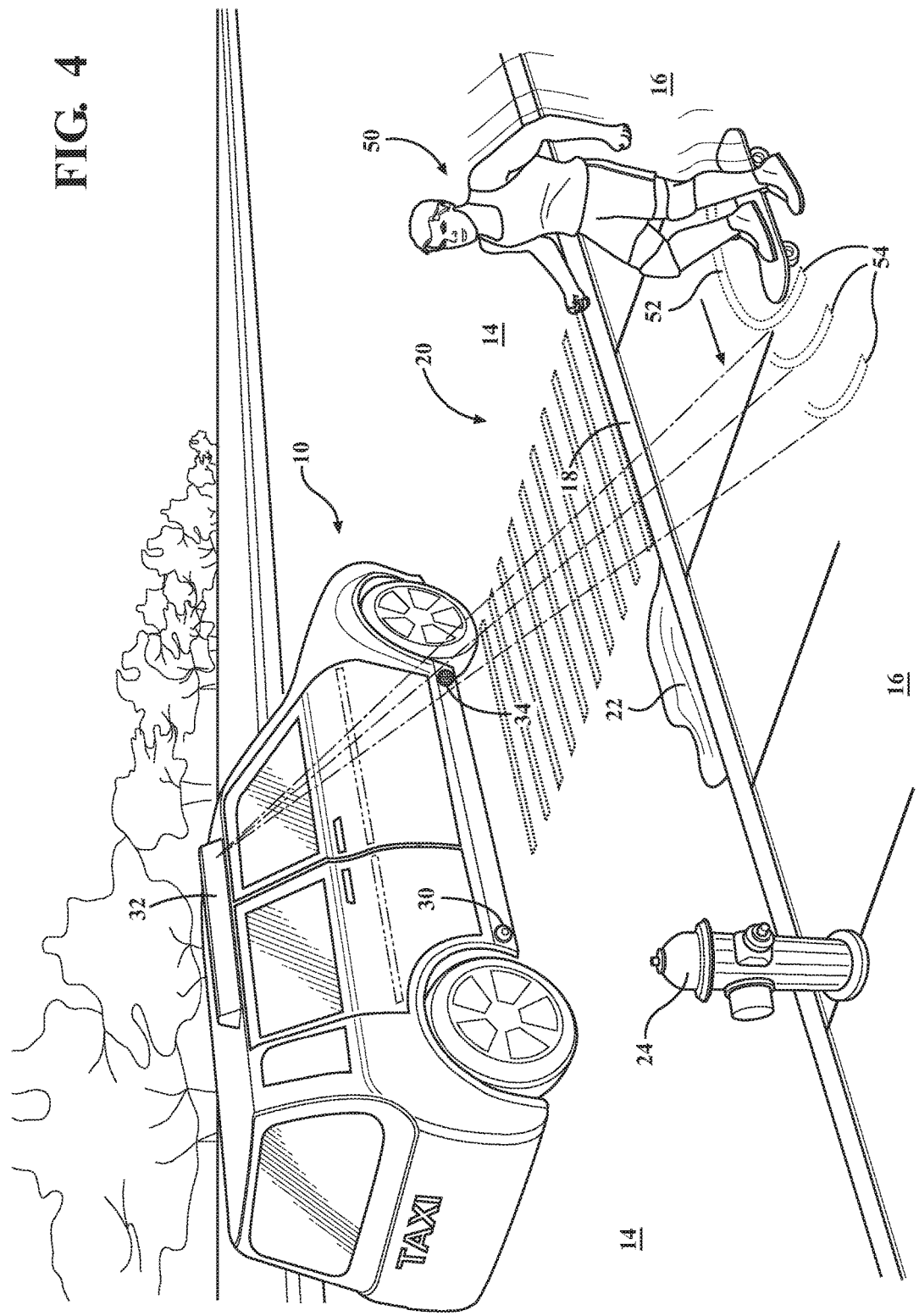
FIG. 4 is a schematic isometric view of the vehicle highlighting a dynamic obstacle and a predicted pathway of the dynamic obstacle.

The vehicle 10 is configured to highlight the dynamic obstacles 50 with one of the projectors mounted on the vehicle 10, such as the light bar 32. As shown in FIG. 4, the vehicle 10 may use a third projection type 52, which is specific to dynamic obstacles 50.

Furthermore, the vehicle 10 may be configured to determine a predicted dynamic pathway 54 of the sensed dynamic obstacles within the drop zone 20, and to highlight the predicted dynamic pathway 54 of the dynamic obstacles 50 with the projector mounted on the vehicle 10. As shown in FIG. 4 the suggested pathway 46 avoids the predicted dynamic pathway 54 of the dynamic obstacle 50.

Alternatively, the vehicle 10 may sense and highlight the dynamic obstacle 50 iteratively as a moving static obstacle. For example, the sensor 30 may be continuously looping and sensing the position of the dynamic obstacle 50 as a static obstacle at each iteration. Therefore, the third projection type 52 would move with each loop or iteration by the sensor 30.

Figure 5:
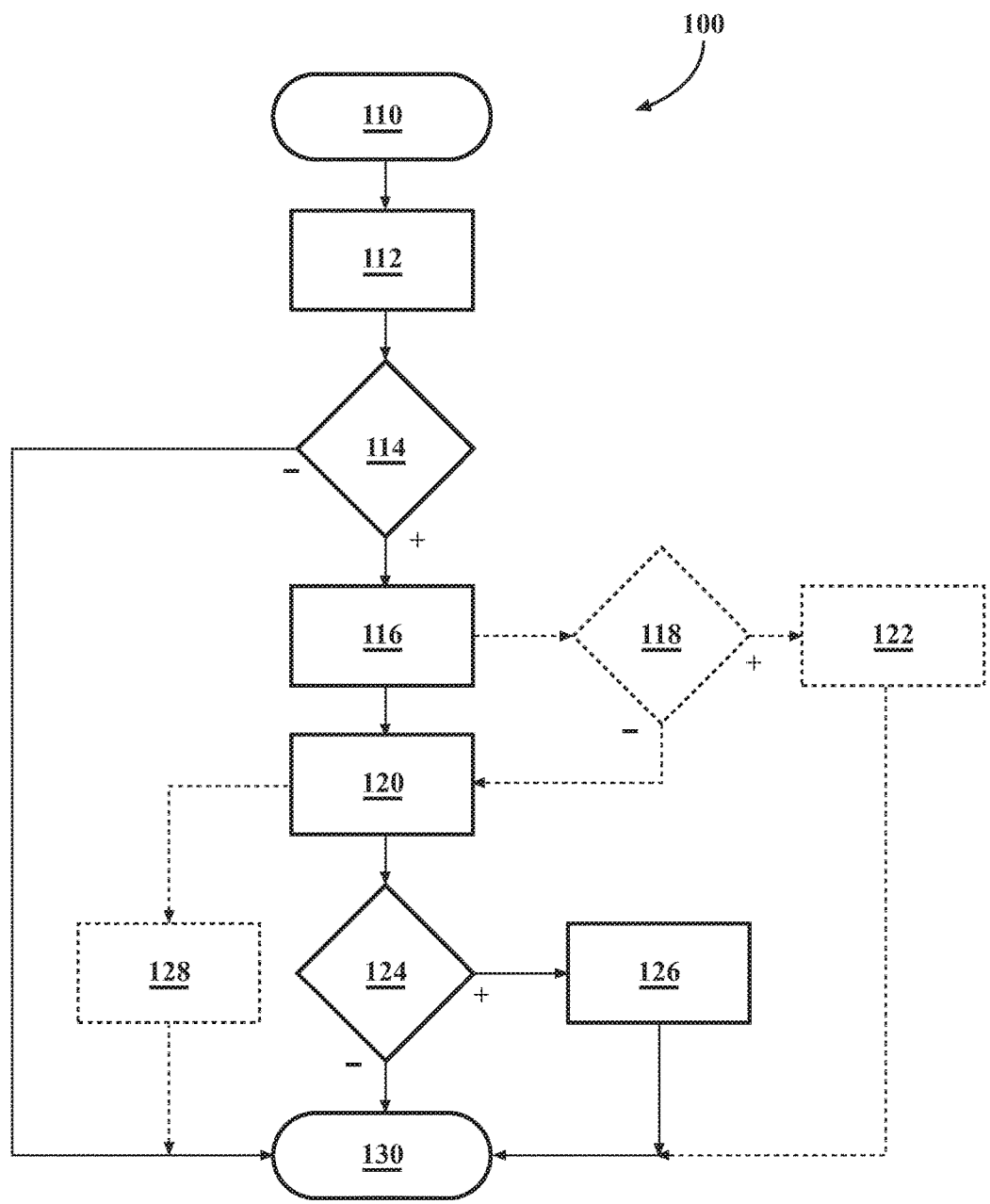
FIG. 5 is a schematic flow chart illustrating one algorithm or method for augmented projection for a passenger of a vehicle, such as the vehicle shown in FIGS. 1-4.

Referring also to FIG. 5, and with continued reference to FIGS. 1-4, there is shown a schematic flow chart of an algorithm or method 100. The vehicle 10, and its control systems, may use the exemplary method 100 to execute the functions and capabilities described herein. However, the method 100 is not limited to execution by the specific structures or functions described relative to the vehicle 10 and in FIGS. 1-4, even though the method 100 is described with respect to those components.

The steps illustrated FIG. 5 are exemplary of one specific algorithm and are not limiting. No steps are required, and any steps may be optional, whether or not identified as such. The order the steps or processes shown is also not limiting. As recognized by skilled artisans, steps may be reordered or realigned.

Step 110: Start/Initialize.

The method 100 may begin operation when called upon by the vehicle 10, such as when the vehicle 10 is stopped or parked. Alternatively, the method 100 may be constantly running or looping.

Step 112: Sense Passenger.

The method 100 monitors or senses the location of the passenger 12. This may include the sensor 30, or another sensor, such as one located within the passenger compartment of the vehicle 10. Additionally, in order to predict that the passenger 12 may be about to enter the drop zone 20, the method 100 may monitor the location or operating mode of the vehicle 10. For example, if the vehicle 10 is an autonomous taxi, when the ride is ending and the vehicle 10 is stopping to drop the passenger 12 in the drop zone 20, the method 100 may begin sensing location of the passenger 12.

Step 114: Passenger Within Drop Zone?

The method 100 determines whether the passenger 12 is within, or about to enter, the drop zone 20. This decision step determines whether the vehicle 10 should sense and highlight potential obstacles within the drop zone 20. If the passenger 12 is not within, or about to enter, the drop zone 20, the method 100 ends or proceeds to an end/loop step 130.

Step 116: Scan Drop Zone for Potential Obstacles.

If the method 100 determines that the passenger 12 is within, or about to enter, the drop zone 20, the method 100 scans the drop zone 20 for potential obstacles. For example, as shown in FIG. 1, the vehicle 10 may sense the first obstacle 22 and the second obstacle 24.

Step 118: Static or Dynamic Obstacles?

In some configurations, the method 100 may determine whether the sensed obstacles are static, such as the first obstacle 22 and the second obstacle 24, or dynamic, such as the dynamic obstacle 50 of FIG. 4. Dynamic obstacles may be treated differently than static obstacles by the method 100.

Step 120: Highlight Obstacles.

The method 100 highlights the obstacles sensed by the vehicle 10. As shown in FIG. 2, the method 100 may use the first projection type 42 and the second projection type 44 to highlight the first obstacle 22 and the second obstacle 24, respectively. Additionally, the method 100 may use the third projection type 52 to highlight the dynamic obstacle 50, as shown in FIG. 4, and may move the third projection type 52 as the dynamic obstacle 50 moves.

Step 122: Predictive Pathway Highlighting.

When the method 100 determines that the sensed object is dynamic, the method 100 may determine the predicted dynamic pathway 54 of the sensed dynamic obstacle 50. Additionally, the method 100 may highlight the predicted dynamic pathway 54 for the passenger 12 with augmented projection from the light bar 32.

Step 124: Proximity Violation or High Severity?

The method 100 may detect or determine the severity level of any sensed static or dynamic obstacles. Additionally, the method 100 may detect the proximity of the passenger 12 to the sensed static or dynamic obstacles.

Step 126: Intense Projection and/or Audio Alert.

The method 100 may intensify the augmented projection based on either severity or proximity of the passenger. For example, as illustrated in FIG. 2, the method 100 may use both the first projection type 42 and the second projection type 44 to highlight the first obstacle 22 and the second obstacle 24, respectively, based on differing severity determinations.

Additionally, as illustrated in FIG. 3, the method 100 may use the high-intensity projection 48 to further alert the passenger 12 to her or his proximity to the second obstacle 24. The method 100 may also use an audio alert, such as from the speaker 34, to further alert the passenger 12 to her or his proximity a static or dynamic obstacle.

Step 128: Recommended Pathway Projection.

In combination with highlighting static obstacles, dynamic obstacles, or both, the method 100 may project the suggested pathway 46 as a recommended route for the passenger 12 exiting or entering the vehicle 10. Alternatively, the suggested pathway 46 may be used in lieu of highlighting obstacles.

Step 130: End/Loop.

The method 100 may be running constantly, such that all steps may be occurring at any time. Alternatively, the method 100 may loop iteratively, such as on a schedule. Irrespective, when the method 100 reaches the end, it is likely that process may repeat as long as the initialization conditions exist.

The detailed description and the drawings or figures are supportive and descriptive of the subject matter discussed herein. While some of the best modes and other embodiments have been described in detail, various alternative designs, embodiments, and configurations exist.

The invention claimed is:

1. A method of augmented projection for a vehicle having at least one sensor and a controller, comprising:
    sensing that a passenger of the vehicle is within a drop zone; and
    wherein, if the passenger is within the drop zone, the controller is configured for:
        sensing one or more static obstacles within the drop zone; and
        highlighting at least one of the sensed static obstacles with a projector mounted on the vehicle, wherein highlighting includes casting light from the projector directly onto at least one of the sensed static obstacles.

2. The method of claim 1, wherein the controller is further configured for:
    sensing that the passenger is about to enter the drop zone.

3. The method of claim 1 wherein the controller is further configured for:
    sensing one or more dynamic obstacles within the drop zone; and
    highlighting the dynamic obstacles with the projector mounted on the vehicle.

4. The method of claim 3, wherein the controller is further configured for:
    determining a predicted pathway of the sensed dynamic obstacles within the drop zone; and
    highlighting the predicted pathway of the dynamic obstacles with the projector mounted on the vehicle.

5. The method of claim 4, wherein the controller is further configured for:
    projecting a suggested pathway for the passenger, wherein the suggested pathway avoids the static obstacles and avoids the predicted pathway of the dynamic obstacles.

6. The method of claim 1, wherein the controller is further configured for:
    sensing proximity of the passenger to the one or more static obstacles within the drop zone,
    wherein highlighting the static obstacles with the projector mounted on the vehicle includes a low-intensity projection and a high-intensity projection, occurring when the passenger is proximal to at least one of the static obstacles.

7. The method of claim 1, wherein the controller is further configured for:
projecting a suggested pathway for the passenger, wherein the suggested pathway avoids the static obstacles.

8. The method of claim 1, wherein the controller is further configured for:
assigning a first severity level to a first static object, wherein highlighting the static obstacles includes a first projection type for the first severity level; and
assigning a second severity level to a second object wherein highlighting the static obstacles includes a second projection type, different from the first projection type, for the second severity level.

9. The method of claim 1, wherein sensing one or more static obstacles within the drop zone includes three-dimensional sensing.

10. The method of claim 1, wherein the controller is further configured for:
sensing location of the passenger within the drop zone;
determining proximity of the passenger to the one or more static obstacles;
comparing the determined proximity of the passenger to a minimum distance; and
sounding an audio alert when the passenger is less than the minimum distance from one of the static obstacles.

11. A method of augmented projection for a vehicle, comprising:
sensing that a passenger of the vehicle is one of within a drop zone and about to enter the drop zone;
sensing one or more static obstacles within the drop zone;
highlighting the static obstacles with a projector mounted on the vehicle;
sensing one or more dynamic obstacles within the drop zone; and
highlighting the dynamic obstacles with the projector mounted on the vehicle,
wherein the sensing and highlighting are executed by a control system operatively connected to one or more sensors and to the projector of the vehicle.

12. The method of claim 11, further comprising:
projecting a suggested pathway for the passenger, wherein the suggested pathway avoids the static obstacles and avoids the dynamic obstacles.

13. The method of claim 12, further comprising:
sensing proximity of the passenger to the one or more static obstacles within the drop zone,
wherein highlighting the static obstacles, with the projector mounted on the vehicle, includes a low-intensity projection, occurring when the passenger is distal from at least one of the static obstacles, and a high-intensity projection, occurring when the passenger is proximal to at least one of the static obstacles.

14. The method of claim 12, further comprising:
assigning a first severity level to a first static object, wherein highlighting the static obstacles includes a first projection type for the first severity level; and
assigning a second severity level to a second object wherein highlighting the static obstacles includes a second projection type, different from the first projection type, for the second severity level.

15. An apparatus for augmented projection from a vehicle, comprising:
one or more sensors configured to:
determine whether a passenger is within a drop zone, and whether one or more dynamic obstacles within the drop zone;
determine a location of one or more static obstacles within the drop zone;
a projector configured to highlight at least one of the sensed static obstacles within the drop zone, and to highlight the dynamic obstacles within the drop zone; and
a controller configured to determine a predicted pathway of the sensed dynamic obstacles within the drop zone, wherein the projector is further configured to highlight the predicted pathway of the dynamic obstacles moving through the drop zone.

16. The apparatus of claim 15,
wherein the controller is further configured to determine a suggested pathway through the drop zone for the passenger, wherein the suggested pathway avoids the static obstacles and avoids the predicted pathway of the dynamic obstacles; and
wherein the projector is further configured to project the suggested pathway.

* * * * *